United States Patent
Zelinski (12)

(10) Patent No.: US 10,465,578 B1
(45) Date of Patent: *Nov. 5, 2019

(54) LIQUID COOLED EXHAUST MANIFOLD WITH DETACHABLE PIPES

(71) Applicant: Joseph R. Zelinski, Oshkosh, WI (US)

(72) Inventor: Joseph R. Zelinski, Oshkosh, WI (US)

(\*) Notice: Subject to any disclaimer, the term of this patent is extended or adjusted under 35 U.S.C. 154(b) by 59 days.

This patent is subject to a terminal disclaimer.

(21) Appl. No.: 15/887,175

(22) Filed: Feb. 2, 2018

Related U.S. Application Data

(63) Continuation-in-part of application No. 15/687,624, filed on Aug. 28, 2017.

(51) Int. Cl.
*F01N 3/04* (2006.01)
*F01N 13/14* (2010.01)
*F01N 13/18* (2010.01)

(52) U.S. Cl.
CPC ........... *F01N 3/046* (2013.01); *F01N 13/141* (2013.01); *F01N 13/1805* (2013.01)

(58) Field of Classification Search
CPC ..... F01N 3/046; F01N 13/141; F01N 13/1805
See application file for complete search history.

(56) References Cited

U.S. PATENT DOCUMENTS

| 4,711,088 A | 12/1987 | Berchem et al. |
| 7,827,690 B1 | 11/2010 | Zelinski |

*Primary Examiner* — Audrey K Bradley
(74) *Attorney, Agent, or Firm* — Donald J. Easler

(57) ABSTRACT

A liquid cooled manifold preferably includes a manifold assembly and at least two exhaust pipes. The manifold assembly includes at least one manifold plate, a plurality of fastener o-rings, at least two first pipe sealing o-rings, at least two second pipe sealing o-rings, at least two pipe locking rings. Each exhaust pipe includes an inner pipe and an outer pipe. At least two water slots or two water cavities are formed in the at least one manifold plate to communicate with a water entry tube. Water flows through the water entry tube into a cavity between the inner and outer pipes in each exhaust pipe. The at least two exhaust pipes may be removed from the collector and manifold plates without cutting.

12 Claims, 16 Drawing Sheets

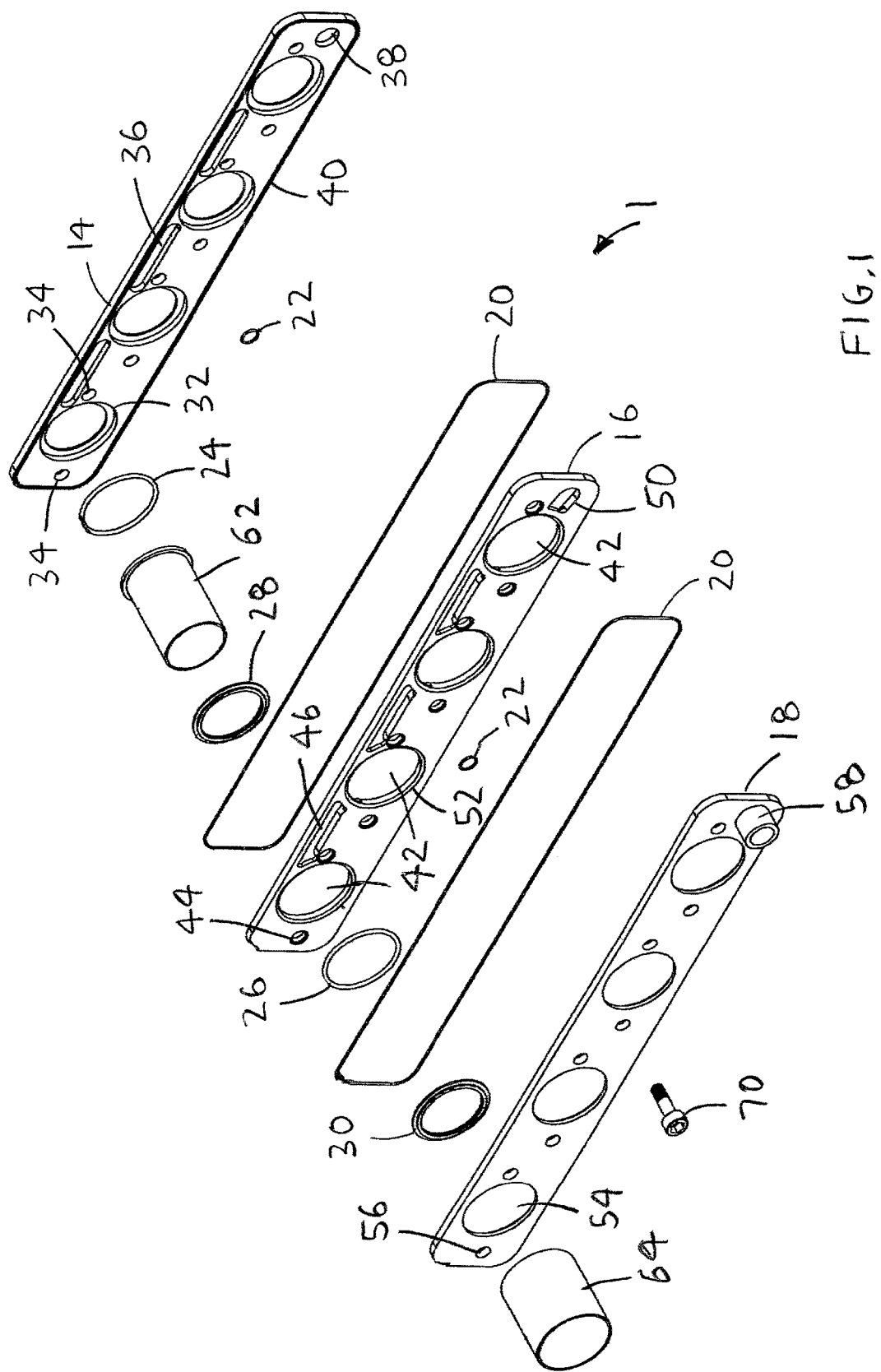

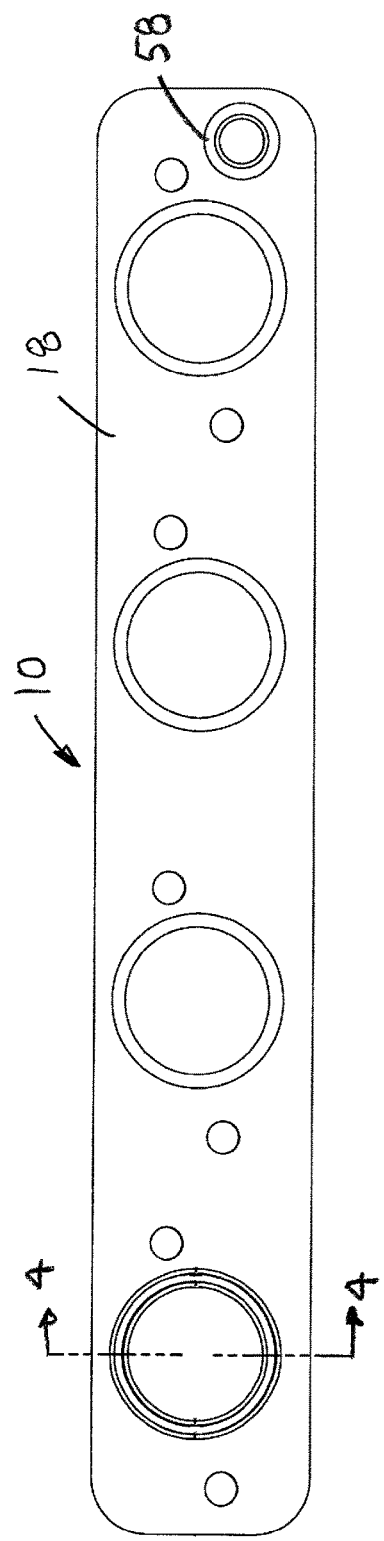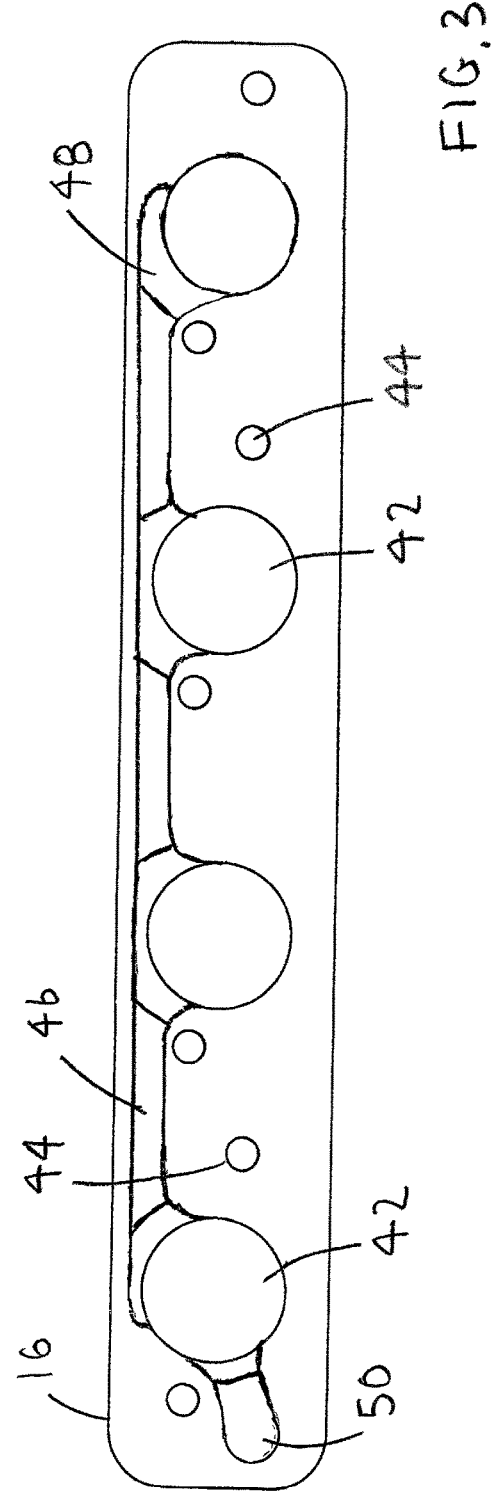

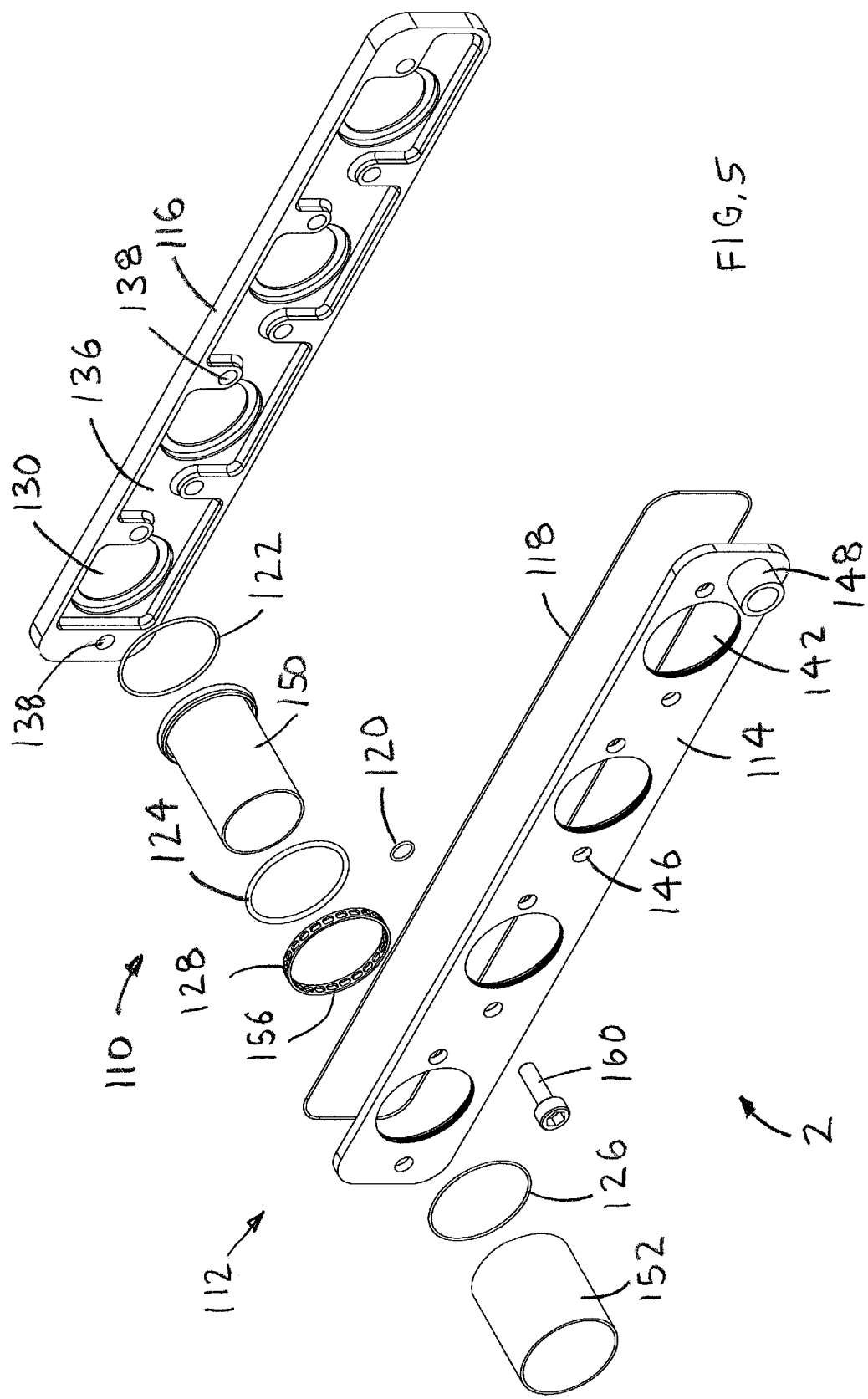

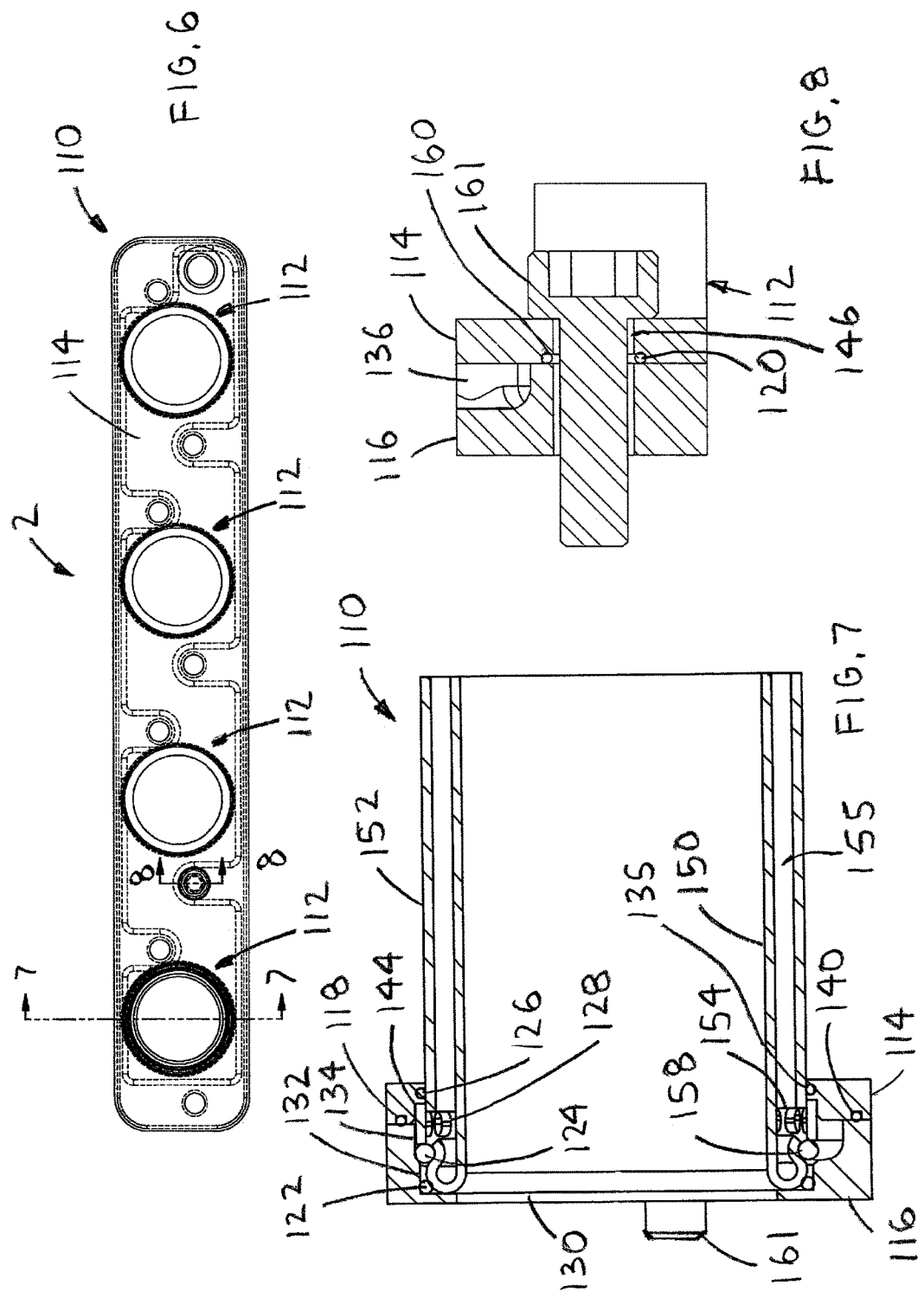

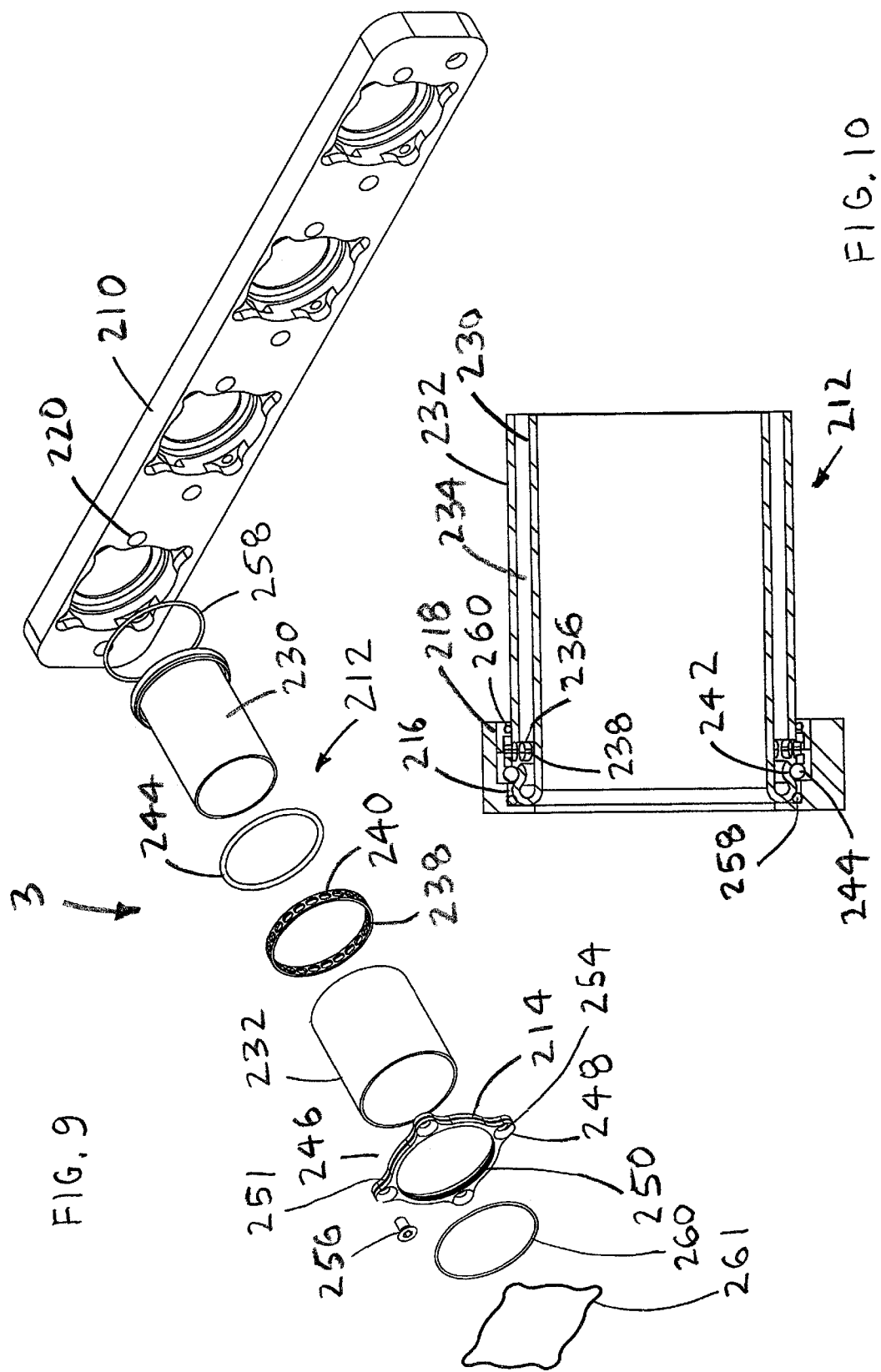

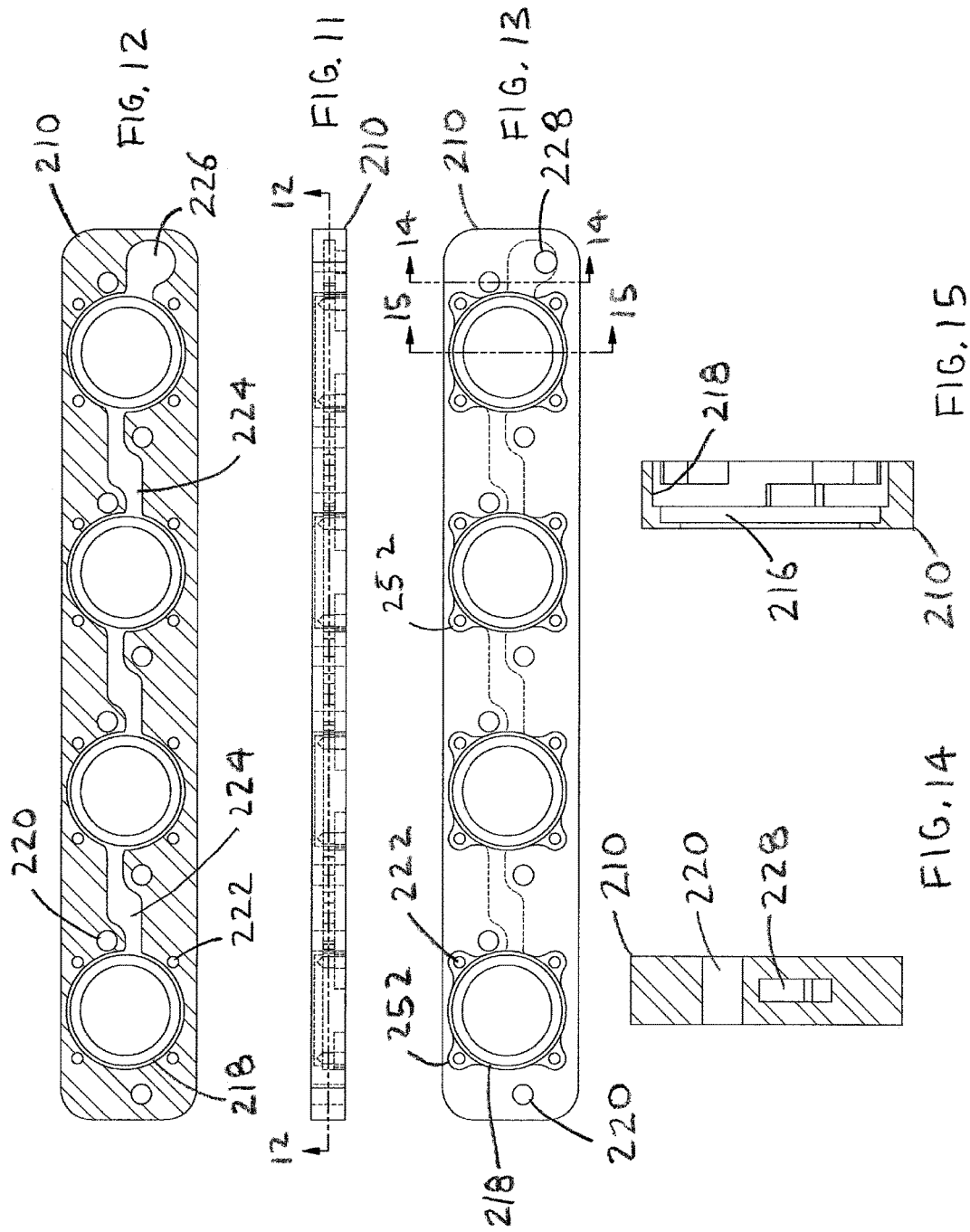

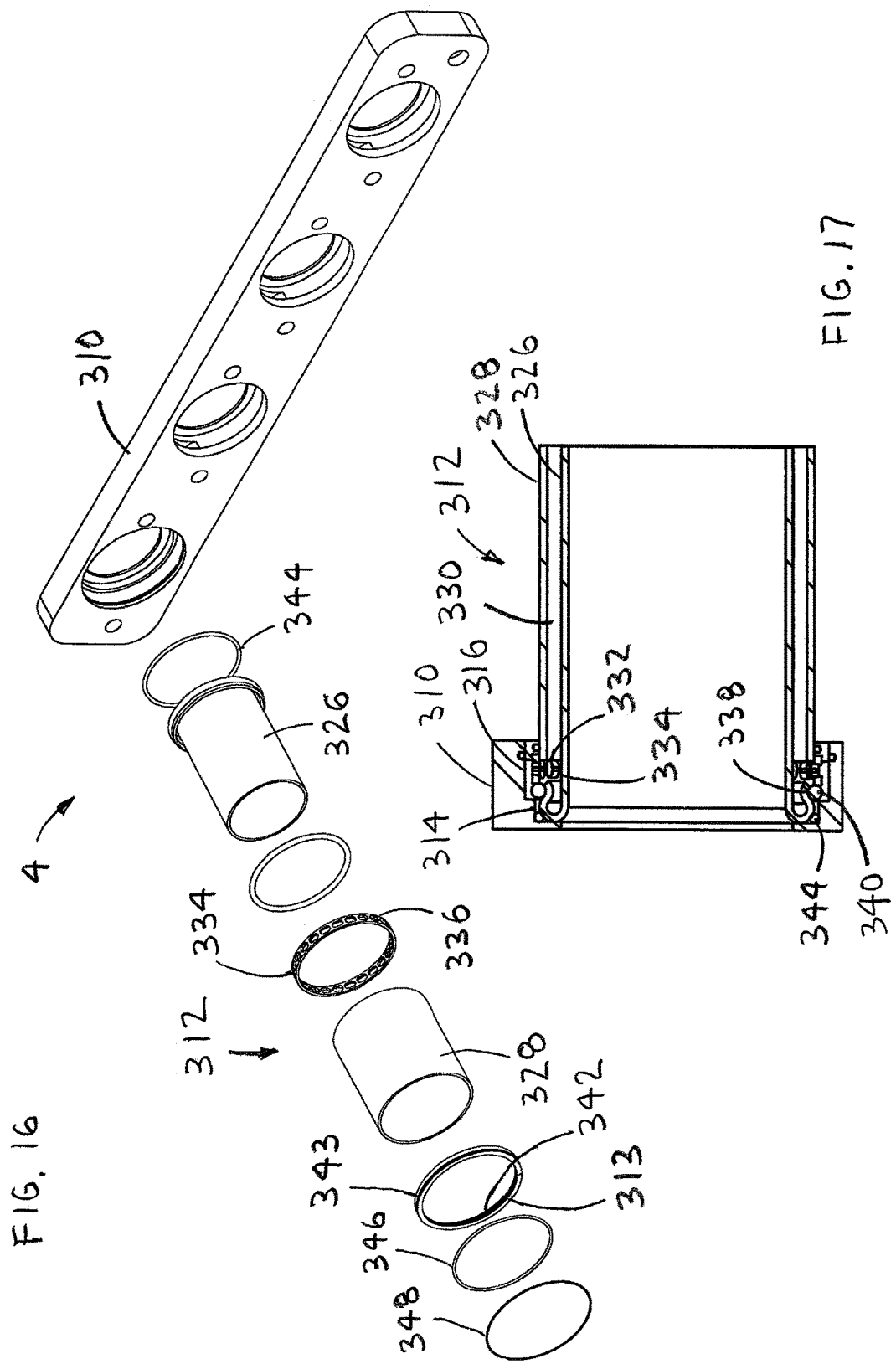

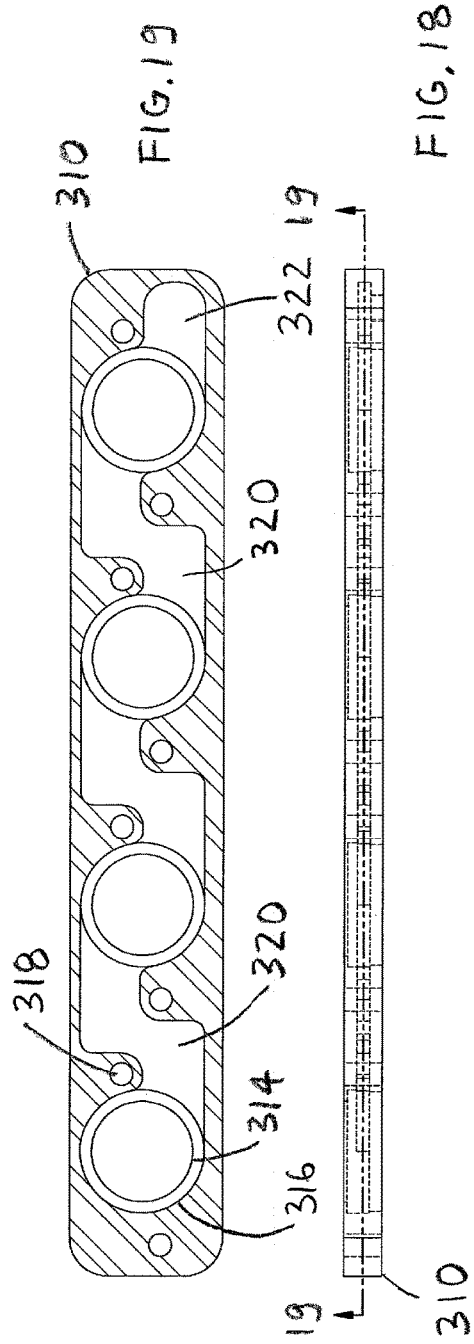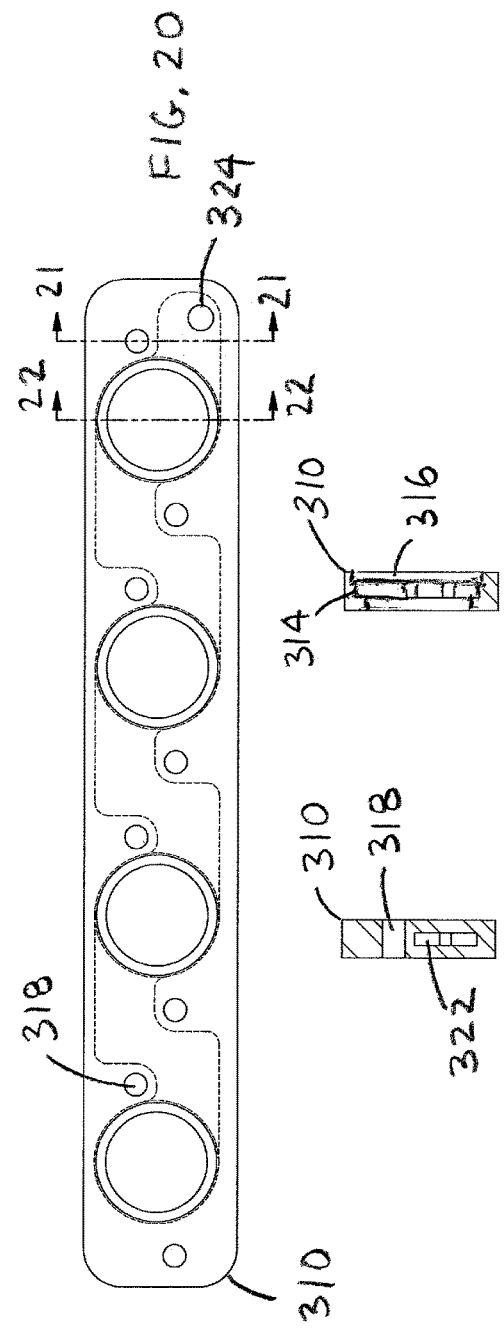

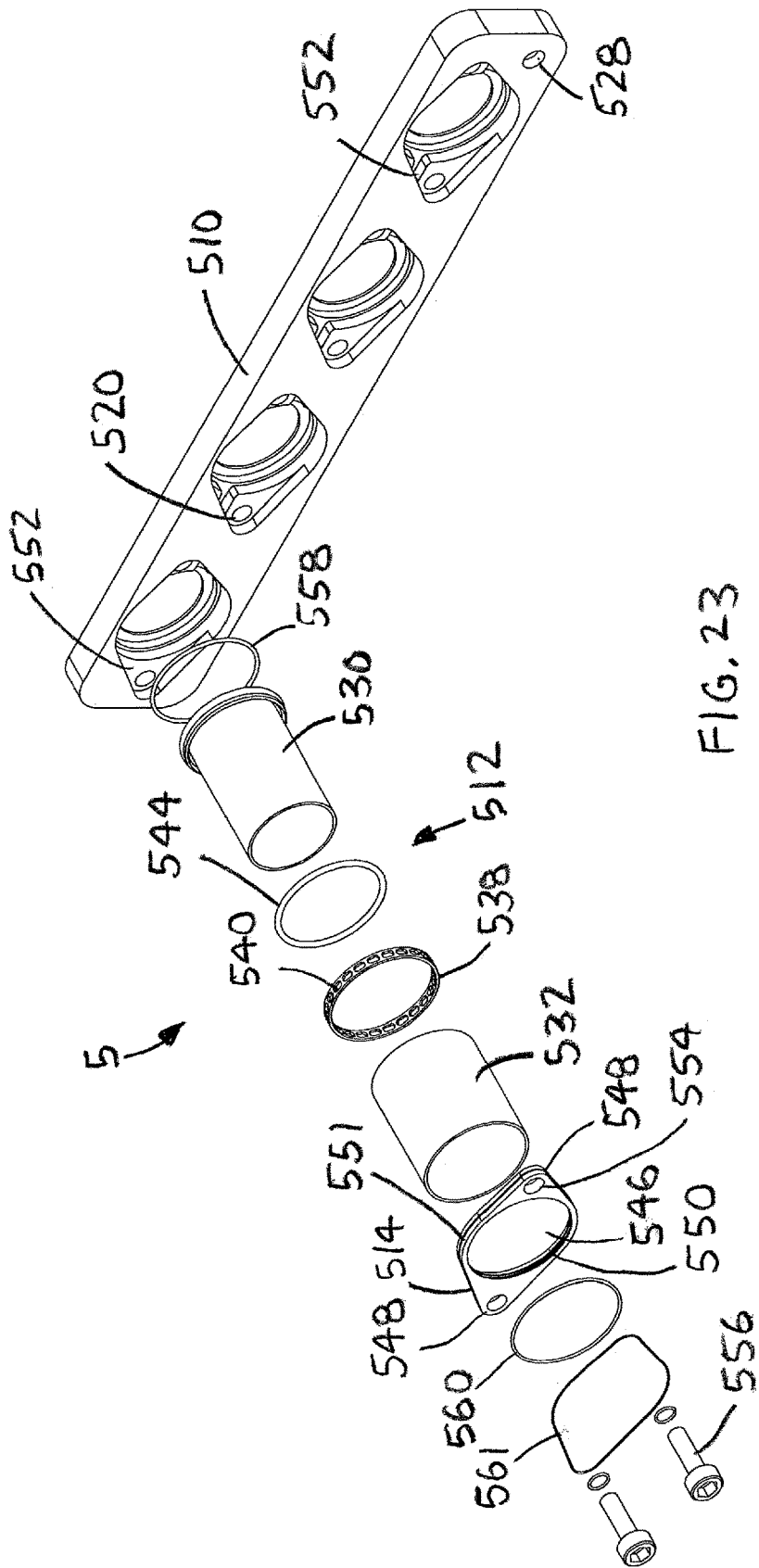

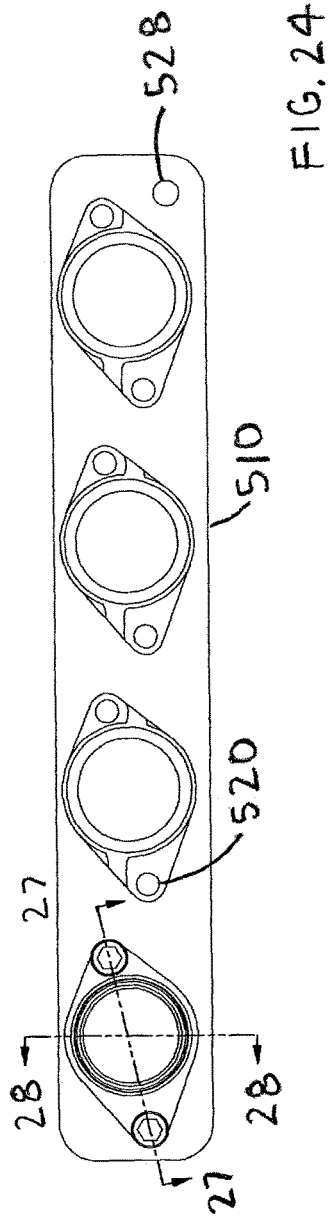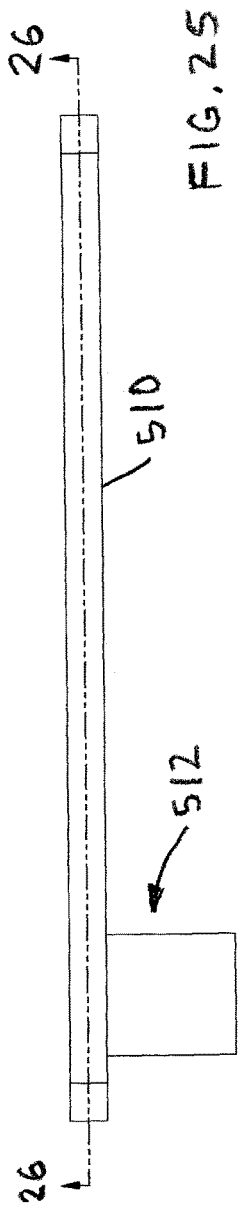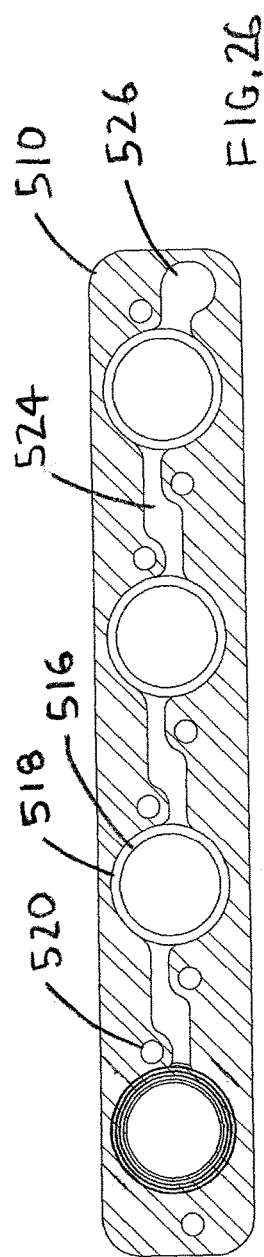

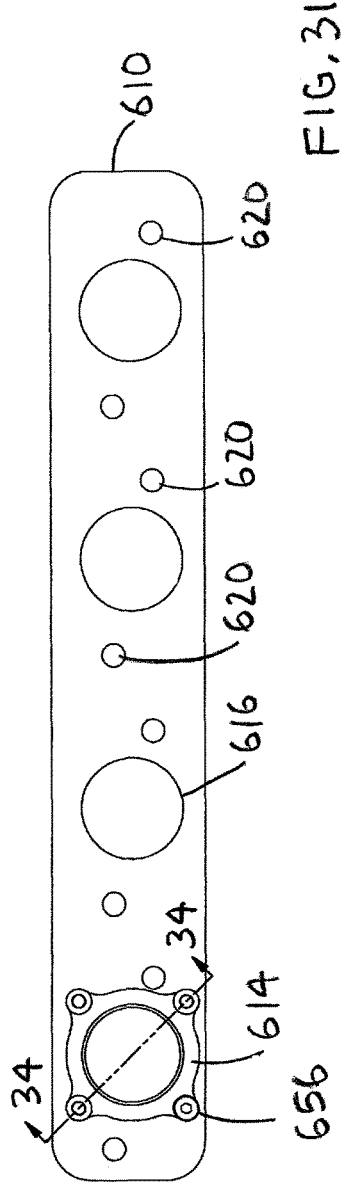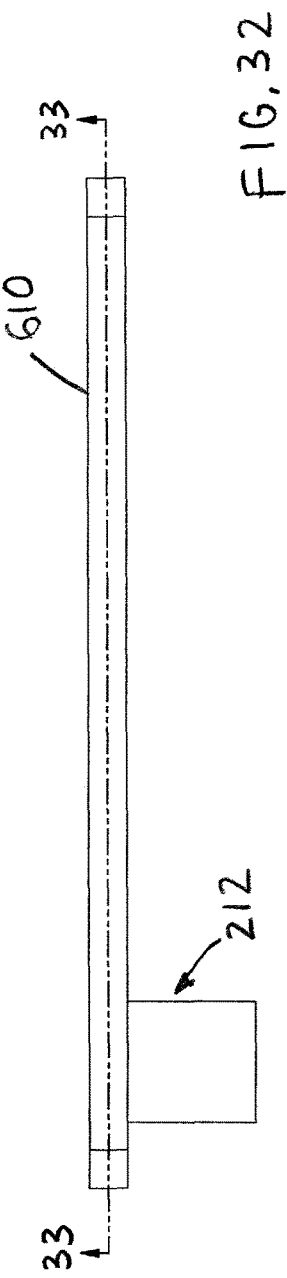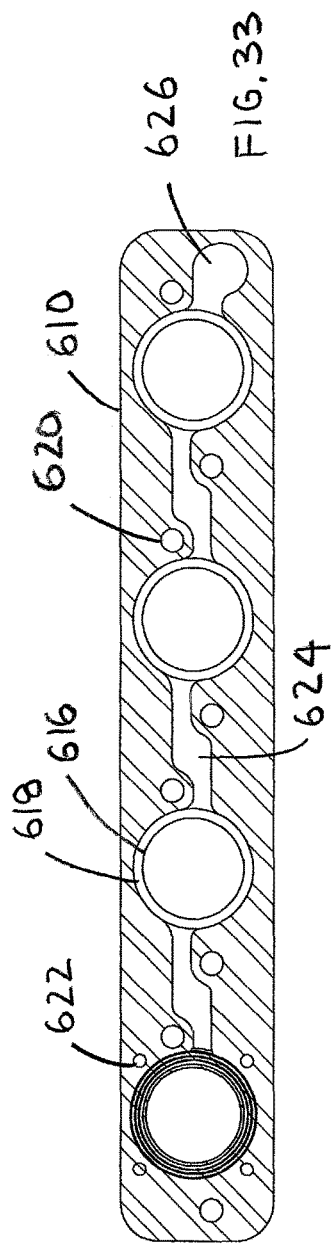

LIQUID COOLED EXHAUST MANIFOLD WITH DETACHABLE PIPES

CROSS-REFERENCES TO RELATED APPLICATIONS

This continuation in part patent application claims the benefit of patent application Ser. No. 15/687,624, filed on Aug. 28, 2017.

BACKGROUND OF THE INVENTION

Field of the Invention

The present invention relates generally to marine exhaust systems and more specifically to a liquid cooled exhaust manifold with detachable pipes, which allows a single damaged exhaust pipe to be removed and replaced by unbolting a manifold plate assembly.

Discussion of the Prior Art

It appears that the prior art does not teach or suggest a liquid cooled exhaust manifold with detachable pipes. U.S. Pat. No. 7,827,690 to Zelinski discloses a method of attaching a collector. U.S. Pat. No. 4,711,088 to Berchem et al. discloses a liquid cooled exhaust manifold. However, neither reference teaches detachable manifold pipes.

Accordingly, there is a clearly felt need in the art for a liquid cooled exhaust manifold with detachable pipes, which allows a single damaged exhaust pipe to be removed and replaced by unbolting a manifold assembly from an engine.

SUMMARY OF THE INVENTION

The present invention provides a liquid cooled exhaust manifold with detachable pipes, which allows a damaged exhaust pipe to be removed and replaced without cutting and welding. The liquid cooled exhaust manifold with detachable pipes (liquid cooled manifold) preferably includes a manifold assembly and at least two exhaust pipes. The manifold assembly includes three manifold plates, two peripheral manifold sealing o-rings, a plurality of fastener o-rings, at least two first pipe sealing o-rings, at least two second pipe sealing o-rings, at least two first pipe locking rings and at least two second pipe locking rings. A base manifold plate preferably includes at least two pipe counterbores, at least four bolt holes, at least one water passage slot, a water entry cavity and a peripheral o-ring slot. Each pipe counterbore is sized to receive an outer diameter of a single exhaust pipe and the first pipe sealing o-ring. Two of the at least four bolt holes are formed on opposing sides of each the pipe counterbores. Each water passage slot is formed between adjacent pipe counterbores. The water entry cavity formed adjacent an end pipe counterbore. A first one of the two peripheral o-rings is inserted into the peripheral o-ring slot.

A middle manifold plate preferably includes at least two pipe bores, at least four bolt holes, at least two water passage cavities, a rear water passage slot and a water entry hole. Each pipe bore preferably includes a front entrance chamfer. Each pipe bore is sized to receive an outer diameter of a single exhaust pipe. The front entrance chamfer is sized to receive the second pipe sealing o-ring. Two of the at least four bolt holes are formed on opposing sides of each the pipe rear counterbores. Each water passage cavity is formed between adjacent pipe counterbores. The water entry hole is formed adjacent an end pipe rear counterbore. The rear water passage slot is formed from the entry hole to an opposing end of the middle manifold plate. The rear water passage slot allows water to flow from the water entry hole to the at least two pipe rear counterbores.

A cover manifold plate preferably includes at least two pipe rear counterbores, at least four bolt holes, a water entry tube and a cover peripheral o-ring groove. Each pipe rear counterbore is sized to receive an outer diameter of a single exhaust pipe and provide clearance for the second pipe locking ring. Two of the at least four bolt holes are formed on opposing sides of each the pipe bore. The water entry tube is formed concentric with the water entry hole and the water entry cavity. A second one of the two peripheral o-rings is inserted into the cover peripheral o-ring slot. Each exhaust pipe includes an inner pipe and an outer pipe. Each end of the inner pipe tube is preferably roll sealed to the outer pipe. A peripheral water slot is cut through the outer pipe at a manifold end thereof to allow water to flow between the inner and outer pipes. A pipe cooling cavity is formed between the inner and outer pipes. A water exit opening is formed in an opposing end of the exhaust pipe. Water flows through the water entry tube; and through the rear water passage slot to the at least two pipe cooling cavities. Water exits the at least two pipe cooling cavities through the water exits into a collector. The at least two exhaust pipes may be removed from the collector without cutting and welding. The manifold assembly is attached to an engine head with at least four threaded fasteners. A manifold assembly for a single exhaust pipe may also be fabricated. The manifold assembly for a single exhaust pipe would also include a water entry tube.

A second embodiment of a liquid cooled manifold includes a manifold assembly and at least two exhaust pipe. The manifold assembly preferably includes a cover manifold plate, a base manifold plate, a peripheral manifold o-ring, a plurality of fastener o-rings, at least two first pipe o-rings, at least two second pipe o-rings, at least two third pipe o-rings and at least two split locking rings.

A third embodiment of a liquid cooled manifold preferably includes a manifold plate, at least two exhaust pipes and at least two retention rings. The manifold plate includes at least two o-ring counterbores, at least two tube counterbores, a plurality of manifold holes, a plurality of threaded retention holes, at least two water flow cavities, an inlet cavity and an inlet hole.

A fourth embodiment of a liquid cooled manifold preferably includes a manifold plate, at least two exhaust pipes and a retention ring. The manifold plate includes at least two o-ring counterbores, at least two tube counterbores, a plurality of manifold holes, at least two water flow cavities, an inlet cavity and an inlet hole.

A fifth embodiment of a liquid cooled manifold preferably includes a manifold plate, at least two exhaust pipes and at least two retention flanges. The manifold plate includes at least two o-ring counterbores, at least two tube counterbores, at least two flange cavities, a plurality of manifold holes, a plurality of threaded retention holes, at least two water flow cavities, an inlet cavity and an inlet hole.

A sixth embodiment of a liquid cooled manifold preferably includes a manifold plate, at least two exhaust pipes and at least two retention rings. The manifold plate includes at least two o-ring counterbores, at least two tube counterbores, a plurality of manifold holes, a plurality of threaded retention holes, at least two water flow cavities, an inlet cavity and an inlet hole. The at least two retention rings are retained on a manifold side of the manifold plate.

Accordingly, it is an object of the present invention to provide a liquid cooled exhaust manifold, which allows a single damaged exhaust pipe to be removed and replaced by unbolting a manifold assembly from an engine.

These and additional objects, advantages, features and benefits of the present invention will become apparent from the following specification.

BRIEF DESCRIPTION OF THE DRAWINGS

FIG. 1 is an exploded perspective view of a liquid cooled exhaust manifold in accordance with the present invention.

FIG. 2 is a front view of a liquid exhaust cooled manifold in accordance with the present invention.

FIG. 3 is a rear view of a middle manifold plate of a liquid cooled exhaust manifold in accordance with the present invention.

FIG. 5 is an exploded perspective view of a second embodiment of a liquid cooled exhaust manifold in accordance with the present invention.

FIG. 6 is a front view of a second embodiment of a liquid cooled exhaust manifold in accordance with the present invention.

FIG. 7 is a cross sectional view of an exhaust pipe in a manifold assembly cut through FIG. 6 of a liquid cooled exhaust manifold in accordance with the present invention.

FIG. 8 is a cross sectional view of a bolt in a manifold assembly cut through FIG. 6 of a liquid cooled exhaust manifold in accordance with the present invention.

FIG. 9 is an exploded perspective view of a third embodiment of a liquid cooled exhaust manifold in accordance with the present invention.

FIG. 10 is a cross sectional view of a third embodiment of a liquid cooled exhaust manifold in accordance with the present invention.

FIG. 11 is a front view of a manifold plate of a third embodiment of a liquid cooled exhaust manifold in accordance with the present invention.

FIG. 12 is a cross sectional view of a manifold plate cut through FIG. 11 of a third embodiment of a liquid cooled exhaust manifold in accordance with the present invention.

FIG. 13 is a top view of a manifold plate of a third embodiment of a liquid cooled exhaust manifold in accordance with the present invention.

FIG. 14 is a cross sectional view of a manifold plate cut through FIG. 13 of a third embodiment of a liquid cooled exhaust manifold in accordance with the present invention.

FIG. 15 is a cross sectional view of a manifold plate cut through an exhaust pipe bore in FIG. 13 of a third embodiment of a liquid cooled exhaust manifold in accordance with the present invention.

FIG. 16 is an exploded perspective view of a fourth embodiment of a liquid cooled exhaust manifold in accordance with the present invention.

FIG. 17 is a cross sectional view of a fourth embodiment of a liquid cooled exhaust manifold in accordance with the present invention.

FIG. 18 is a front view of a manifold plate of a fourth embodiment of a liquid cooled exhaust manifold in accordance with the present invention.

FIG. 19 is a cross sectional view of a manifold plate cut through FIG. 18 of a fourth embodiment of a liquid cooled exhaust manifold in accordance with the present invention.

FIG. 20 is a top view of a manifold plate of a fourth embodiment of a liquid cooled exhaust manifold in accordance with the present invention.

FIG. 21 is a cross sectional view of a manifold plate cut through FIG. 20 of a fourth embodiment of a liquid cooled exhaust manifold in accordance with the present invention.

FIG. 22 is a cross sectional view of a manifold plate cut through an exhaust pipe bore in FIG. 20 of a fourth embodiment of a liquid cooled exhaust manifold in accordance with the present invention.

FIG. 23 is an exploded perspective view of a fifth embodiment of a liquid cooled exhaust manifold in accordance with the present invention.

FIG. 24 is a top view of a manifold plate of a fifth embodiment of a liquid cooled exhaust manifold in accordance with the present invention.

FIG. 25 is a front view of a manifold plate of a fifth embodiment of a liquid cooled exhaust manifold in accordance with the present invention.

FIG. 26 is a cross sectional view of a manifold plate cut through FIG. 25 of a fifth embodiment of a liquid cooled exhaust manifold in accordance with the present invention.

FIG. 31 is a bottom view of a manifold plate of a sixth embodiment of a liquid cooled exhaust manifold in accordance with the present invention.

FIG. 32 is a front view of a manifold plate of a sixth embodiment of a liquid cooled exhaust manifold in accordance with the present invention.

FIG. 33 is a cross sectional view of a manifold plate cut through FIG. 32 of a sixth embodiment of a liquid cooled exhaust manifold in accordance with the present invention.

DETAILED DESCRIPTION OF THE PREFERRED EMBODIMENTS

Figure 4:
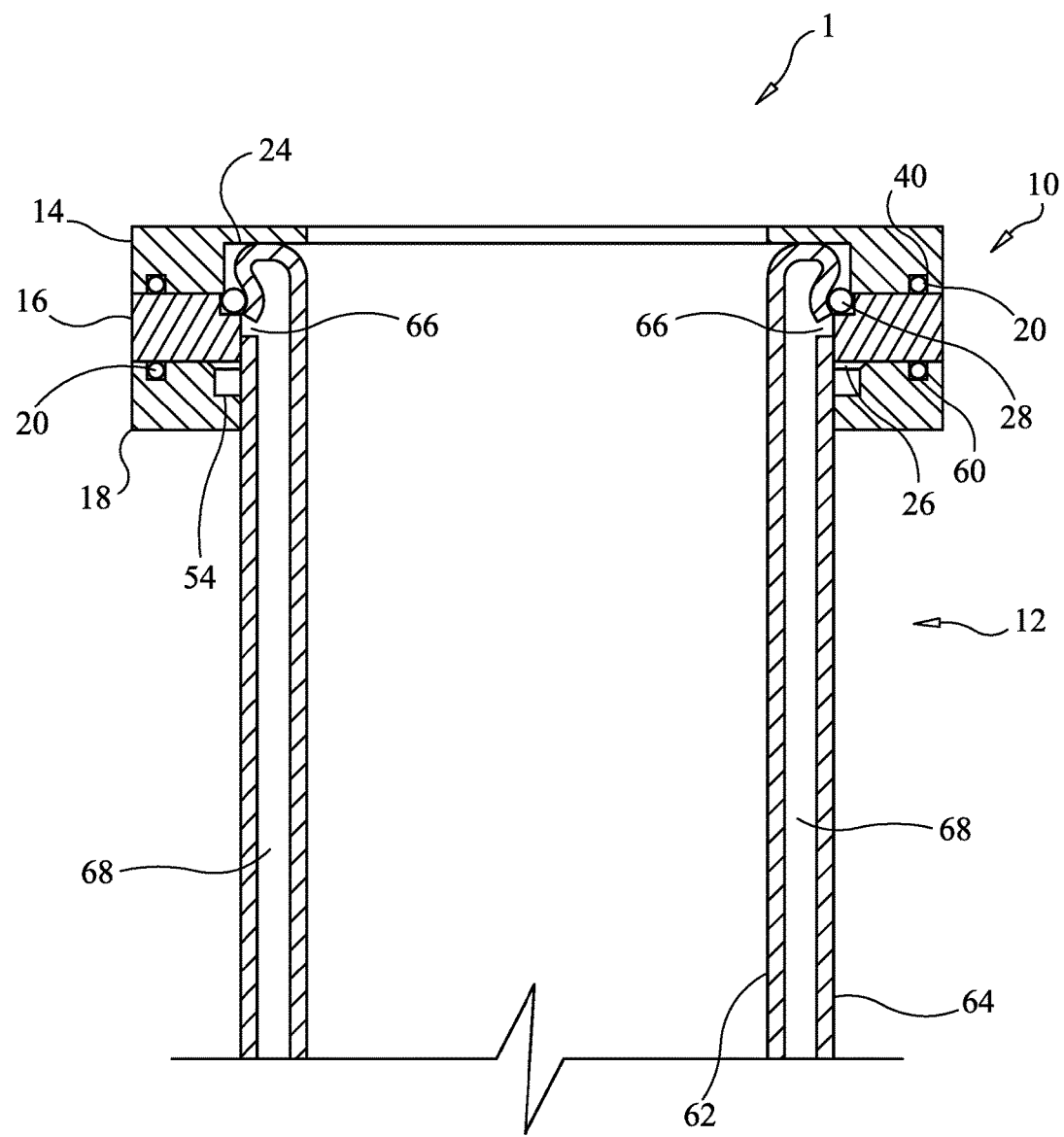
FIG. 4 is a cross sectional view of a liquid cooled exhaust manifold cut through FIG. 1 in accordance with the present invention.
Figure 27:
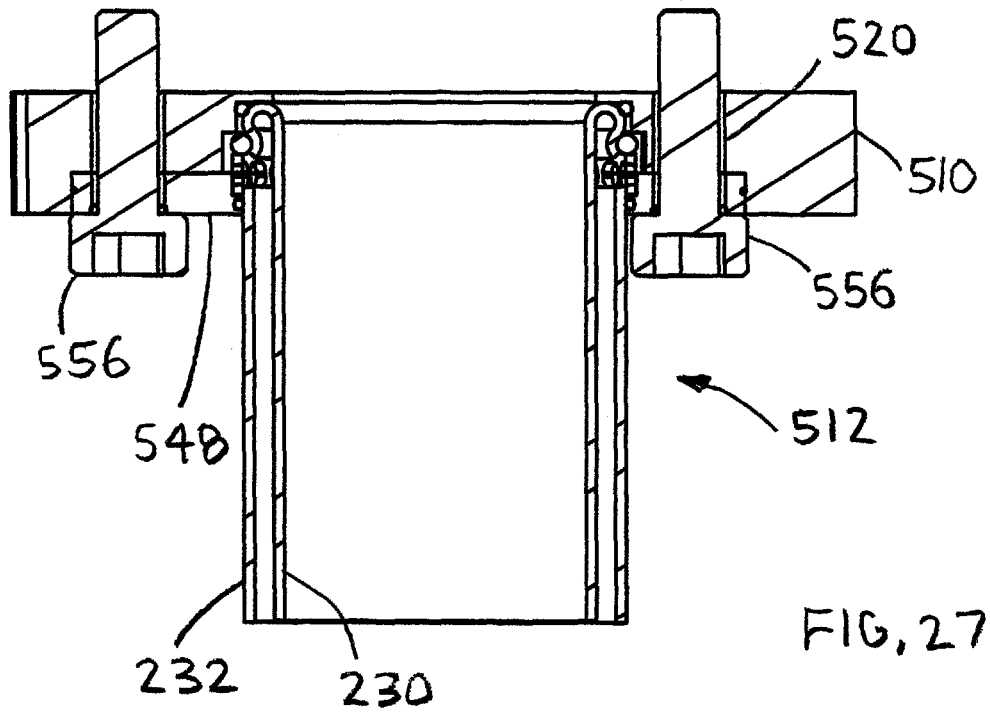
FIG. 27 is a cross sectional view of a manifold plate and exhaust pipe cut through FIG. 24 of a fifth embodiment of a liquid cooled exhaust manifold in accordance with the present invention.
Figure 28:
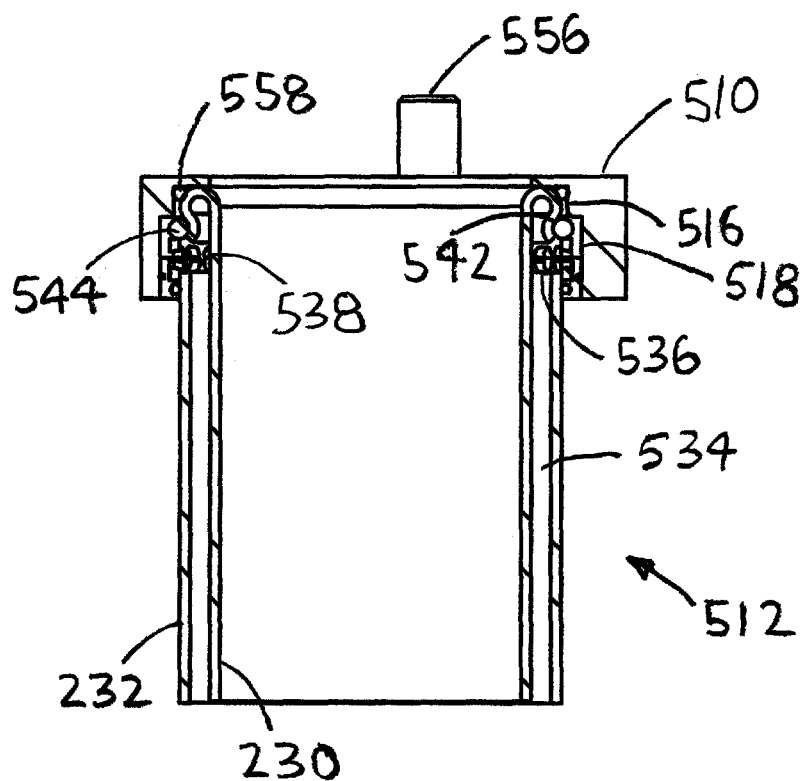
FIG. 28 is a cross sectional view of a manifold plate and exhaust pipe cut through FIG. 24 of a fifth embodiment of a liquid cooled exhaust manifold in accordance with the present invention.
Figure 29:
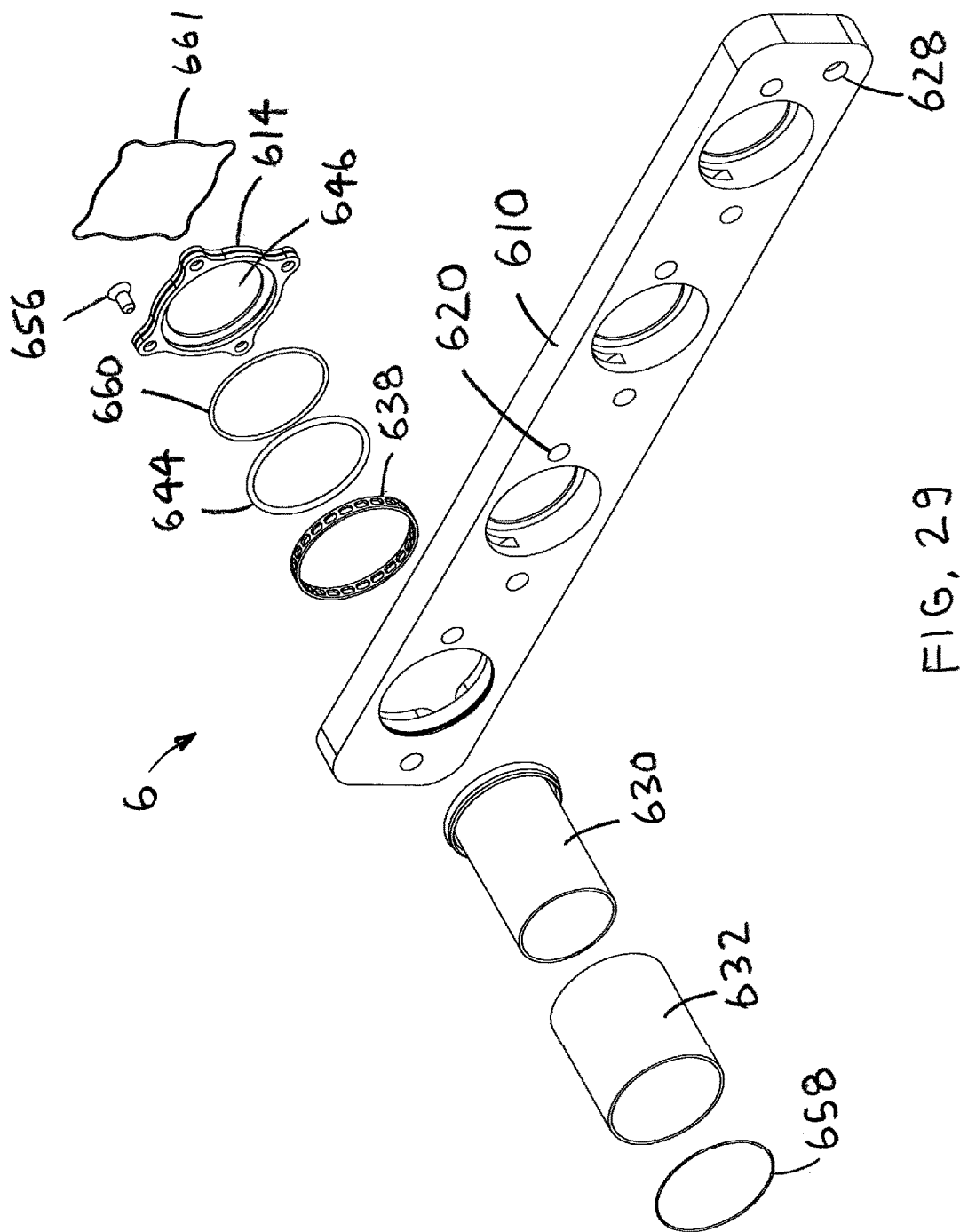
FIG. 29 is a front exploded perspective view of a sixth embodiment of a liquid cooled exhaust manifold in accordance with the present invention.
Figure 30:
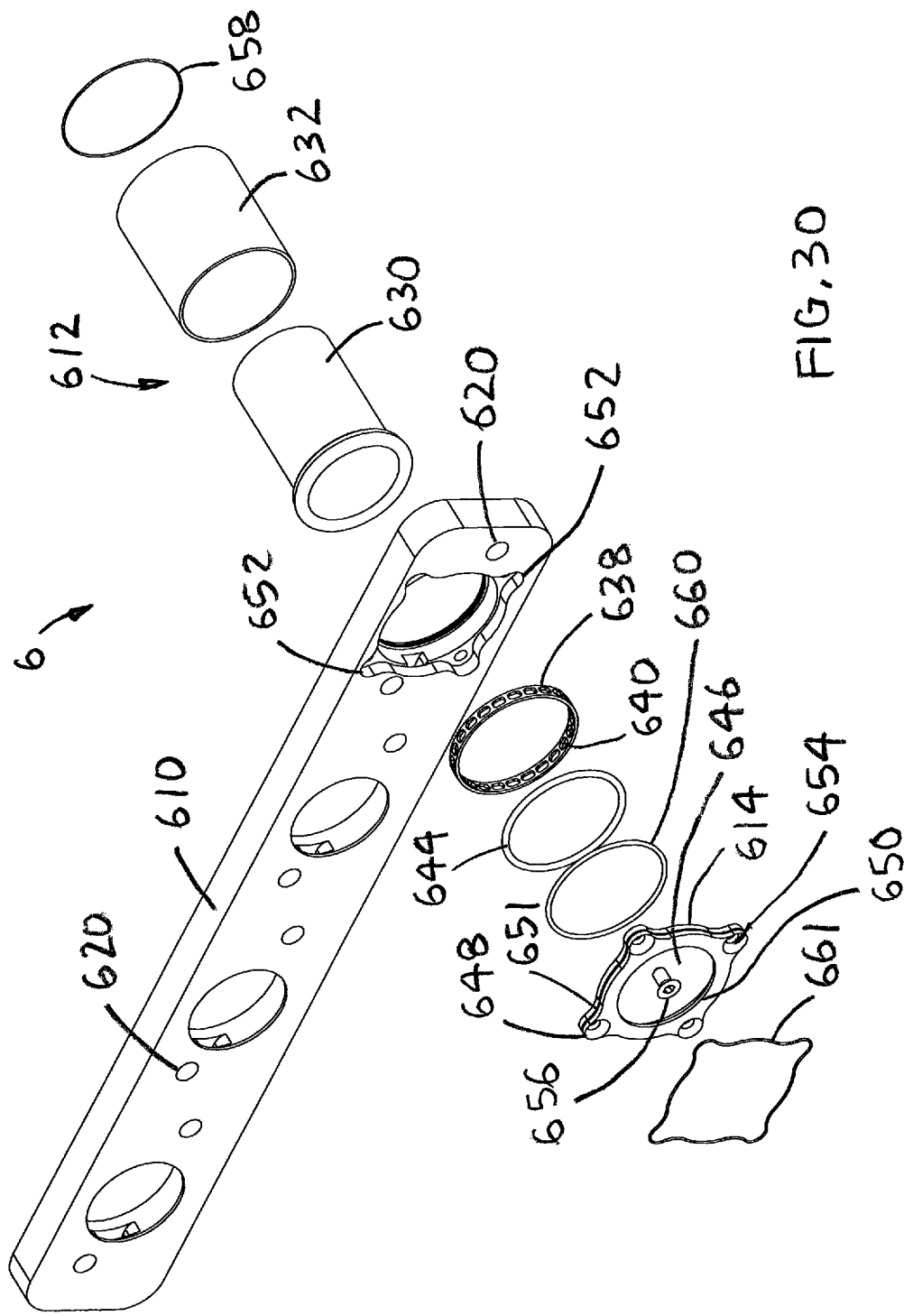
FIG. 30 is a rear exploded perspective view of a sixth embodiment of a liquid cooled exhaust manifold in accordance with the present invention.
Figure 34:
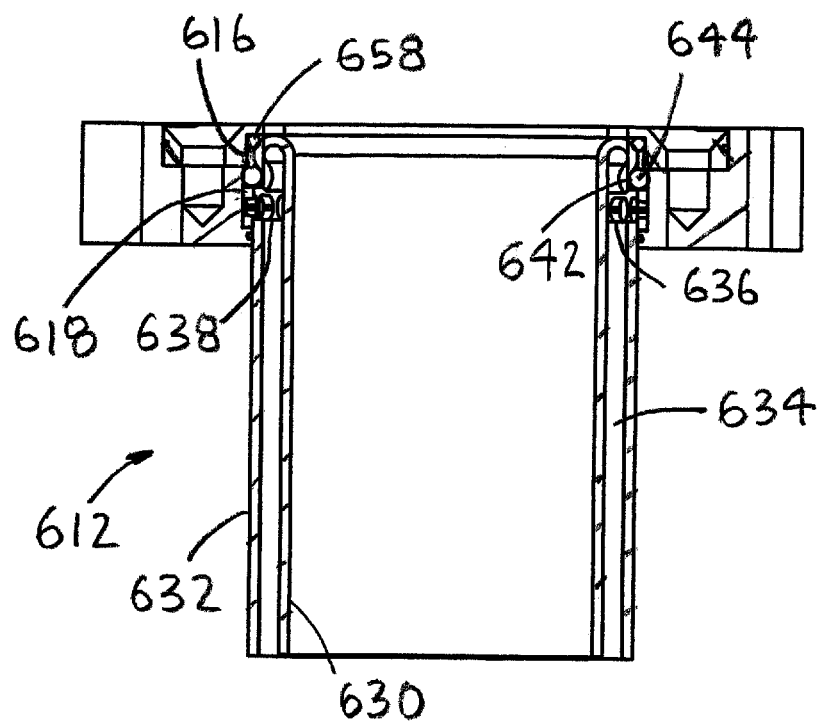
FIG. 34 is a cross sectional view of a manifold plate and exhaust pipe cut through FIG. 31 of a sixth embodiment of a liquid cooled exhaust manifold in accordance with the present invention.

With reference now to the drawings, and particularly to FIG. 1, there is shown an exploded perspective view of a liquid cooled manifold 1. With reference to FIGS. 2-4, the liquid cooled manifold 1 preferably includes a manifold assembly 10 and at least two exhaust pipes 12. The manifold assembly 10 preferably includes three manifold plates 14, 16, 18, two peripheral manifold sealing o-rings 20, a plurality of fastener o-rings 22, at least two first pipe sealing o-rings 24, at least two second pipe sealing o-rings 26, at least three first pipe locking rings 28 and at least two second pipe locking rings 30. However, the three manifold plates may be replaced with two manifold plates. A base manifold plate 14 preferably includes at least two pipe counterbores 32, at least six bolt holes 34, at least two water passage slots 36, a water entry cavity 38 and a peripheral o-ring slot 40. Each pipe counterbore 32 is sized to receive an outer diameter of a single exhaust pipe 12 and the first pipe sealing o-ring 24. Two of the at least six bolt holes 34 are formed on opposing sides of each the pipe counterbores 32. Each water passage slot 36 is formed between adjacent pipe counterbores 32. The water entry cavity 38 is formed adjacent an end pipe counterbore 32. A first one of the two peripheral o-rings 20 is inserted into the peripheral o-ring slot 40.

A middle manifold plate 16 preferably includes at least two pipe bores 42, at least six bolt holes 44, at least two water passage cavities 46, a rear water passage slot 48 and a water entry hole 50. Each pipe bore 42 preferably includes a front entrance chamfer 52. Each pipe bore 42 is sized to receive an outer diameter of a single exhaust pipe 12. The front entrance chamfer 52 is sized to receive the second pipe sealing o-ring 26. Two of the at least six bolt holes 44 are formed on opposing sides of each the pipe bores 42. Each water passage cavity 46 is formed between adjacent pipe bores 42. The water entry hole 50 is formed adjacent an end pipe rear counterbore 42. The rear water passage slot 48 is formed from the water entry hole 50 to an opposing end of the middle manifold plate 16. The rear water passage slot 48 allows water to flow from the water entry hole 50 to the at least two pipe bores 42.

A cover manifold plate 18 preferably includes at least two pipe rear counterbores 54, at least six bolt holes 56, a water entry tube 58 and a cover peripheral o-ring groove 60. Each pipe rear counterbore 54 is sized to receive an outer diameter of a single exhaust pipe 12 and provide clearance for the second pipe locking ring 30. Two of the at least six bolt holes 56 are formed on opposing sides of each the pipe rear counterbores 54. The water entry tube 58 is formed concentric with the water entry hole 50 and the water entry cavity 38. A second one of the two peripheral o-rings 20 is inserted into the cover peripheral o-ring slot 60. Each exhaust pipe 12 includes an inner pipe 62 and an outer pipe 64. Each end of the inner pipe tube 62 is preferably roll sealed to the outer pipe 64. A water slot 66 is cut through the outer pipe 64 at a manifold end thereof to allow water to flow between the inner and outer pipes 62, 64. It is preferable that water slot 66 be cut through an entire perimeter of the outer pipe 64. A pipe cooling cavity 68 is formed between the inner and outer pipes 62, 64. A water exit opening (not shown) is formed in an opposing end of the exhaust pipe 12. Water flows through the water entry tube 58; through the rear water passage slot 48; through the at least two peripheral water slots 66 and to the at least two pipe cooling cavities 68. Water exits the at least two pipe cooling cavities 68 through the water exits into a collector (not shown). The at least two exhaust pipes 12 may be removed from the collector without cutting and welding the manifold assembly 10 and the collector. The manifold assembly 10 is attached to an engine head with at least six threaded fasteners 70. A manifold assembly for a single exhaust pipe 12 may also be fabricated. The manifold assembly for a single exhaust pipe 12 would also include a water entry tube 58.

With reference to FIGS. 5-8, a liquid cooled exhaust manifold 2 preferably includes a manifold assembly 110 and at least two exhaust pipes 112. The manifold assembly 110 preferably includes a cover manifold plate 114, a base manifold plate 116, a peripheral manifold o-ring 118, a plurality of fastener o-rings 120, at least two first pipe o-rings 122, at least two second pipe o-rings 124, at least two third pipe o-rings 126 and at least two split locking rings 128. The base manifold plate 116 preferably includes at least two exhaust holes 130, at least two first pipe counterbores 132, at least two second pipe counterbores 134, a water passage slot 136 and at least six bolt holes 138. Each first pipe counterbore 132 is sized to receive an outer diameter of a single exhaust pipe 112. Two of the at least six bolt holes 138 are formed on opposing sides of each the pipe counterbores 132, 134. The water passage slot 136 communicates with the at least two second pipe counterbores 134.

The cover manifold plate 114 preferably includes a peripheral o-ring slot 140, at least two pipe clearance holes 142, at least two cover counterbores 144, at least six fastener holes 146 and a water entry tube 148. The peripheral o-ring slot 140 is formed in a rear of the cover manifold plate 114 to receive the peripheral manifold o-ring 118. The at least two pipe clearance holes 130 provide clearance for a single exhaust pipe 112. The at least two cover counter bores 144 are formed in a rear of the manifold plate 114 and concentric with the at least two pipe clearance holes 142. A third pipe o-ring groove 135 is formed in a perimeter of an inside edge of the pipe clearance hole 130 to receive the third pipe o-ring 126. The water entry tube 148 is attached to a corner of the cover manifold plate 114. An inner diameter of the water entry tube 148 communicates with the water passage slot 136. Each exhaust pipe 112 includes an inner pipe 150 and an outer pipe 152.

Each exhaust pipe 112 is preferably formed in the following manner. The inner pipe 150 is inserted into the outer pipe 152. A gap between the inner and outer pipes 150, 152 is filled with lead shot and bent into shape. The lead shot is drained from the gap, after being bent. A pipe cooling cavity 155 is formed between the inner and outer pipes 150, 152. The inner pipe 150 is rolled over to meet the outer pipe 152. A pipe gap 154 is maintained between an end of the inner pipe 150 and a rolled over end of the outer pipe 152 to receive the split locking ring 128. The locking split ring 128 includes a diameter, which is larger than the pipe clearance hole 142. The split locking ring 128 includes a plurality of openings 156 to allow the flow of water therethrough. A beading tool is preferably used to create a peripheral concave cavity 158 in the rolled-over end of the inner pipe 150. The peripheral concave cavity 158 is sized to receive the second pipe o-ring 124.

The liquid cooled exhaust manifold 2 is preferably assembled in the following manner. The at least two first pipe o-rings 122 are inserted into the bottom of the at least first counter bores. The third pipe o-ring 126 is inserted into third pipe o-ring grooves 135 in the cover manifold plate 114. The plurality of fastener o-rings 120 are inserted into a plurality of fastener o-ring grooves 160 formed concentric with the plurality of fastener hole 146 in a rear side of the cover manifold plate 114. One end of the at least two exhaust pipes 112 are inserted through the at least two pipe clearance holes 142. The at least two second pipe o-rings 124 are placed in the peripheral concave cavities 158 of the at least two exhaust pipes 112. The at least two locking rings are inserted into the pipe gaps 154 of the at least two exhaust pipes 112. The at least two exhaust pipes 112 are inserted into the first and second pipe counterbores 132, 134.

A plurality of fasteners 161 are inserted into the plurality of fastener holes 138, 146. The plurality of fasteners 161 are used to secure the cover and base manifold plates 114, 116 to a head of an engine (not shown). Water flows through the water entry tube 148; through the water passage slot 136; into the at least two pipe cooling cavities 155; and out of an opposing end of the at least two pipe cooling cavities 155 (not shown). An opposing end of the at least two exhaust pipes 112 is retained in a collector or the like (not shown). Each end of the exhaust pipe 112 is removable from the manifold assembly 110, the collector or the like without cutting and welding. A manifold assembly for a single exhaust pipe 112 may also be fabricated. The manifold assembly for a single exhaust pipe 112 would also include a water entry tube 148.

With reference to FIGS. 9-15, a liquid cooled manifold 3 preferably includes a manifold plate 210, at least two exhaust pipes 212 and at least two retention rings 214. The manifold plate 210 includes at least two o-ring counterbores 216, at least two tube counterbores 218, a plurality of manifold holes 220, a plurality of threaded retention holes 222, at least two water flow cavities 224, an inlet cavity 226 and an inlet hole 228. Each water flow cavity 224 provides fluid communication between two adjacent tube counterbores 218. The inlet cavity 226 provides fluid communication between an end tube counterbore 218 and the inlet hole 228.

Each exhaust pipe 212 includes an inner pipe 230 and an outer pipe 232. Each exhaust pipe 212 is preferably formed in the following manner. The inner pipe 230 is inserted into the outer pipe 232. A gap between the inner and outer pipes 230, 232 is filled with lead shot and bent into shape. The lead shot is drained from the gap, after being bent. A pipe cooling cavity 234 is formed between the inner and outer pipes 230, 232. The inner pipe 230 is rolled over to meet the outer pipe 232. A pipe gap 236 is maintained between an end of the inner pipe 230 and a rolled over end of the outer pipe 232 to receive a split locking ring 238. The split locking ring 238 includes a diameter, which is larger than the tube counterbore 218. The split locking ring 238 includes a plurality of openings 240 to allow the flow of water therethrough. A beading tool is preferably used to create a peripheral concave cavity 242 in the rolled-over end of the inner pipe 230. The peripheral concave cavity 242 is sized to receive a pipe o-ring 244.

Each retention ring 214 includes a tube hole 246, a plurality of attachment lugs 248, an inner o-ring groove 250 and an outer o-ring groove 251. The plurality of attachment lugs 248 extend from an outer perimeter of the retention ring 214. A plurality of lug slots 252 extend from an outer perimeter of the at least two tube counter bores 218 to receive the plurality of attachment lugs 248. A fastener hole 254 is formed through each attachment lug 248 to receive a ring fastener 256.

The liquid cooled exhaust manifold 3 is preferably assembled in the following manner. At least two bottom pipe o-rings 258 are inserted into a bottom of the at least two o-ring counterbores 216. The at least two split locking rings 238 are inserted into the pipe gaps 236 of the at least two exhaust pipes 212. The pipe o-ring 244 is placed in the peripheral concave cavity 242. The at least two exhaust pipes 212 are inserted into the at least two o-ring counterbores 216. A retention ring o-ring 260 is inserted into the inner o-ring groove 250 in the retention ring 248. An outer retention o-ring 261 is inserted into the outer o-ring groove 251. The retention ring 248 is pushed on to the exhaust pipe 212, until it seats in the tube counterbore 218 and the plurality of lug slots 252. The retention ring 248 is secured to the manifold plate 210 by tightening the plurality of ring fasteners 256 in the plurality of manifold holes 220.

A plurality of manifold fasteners (not shown) are inserted into the plurality of manifold holes 220. The plurality of fasteners are used to secure the manifold plate 210 to a head of an engine (not shown). Water flows through the water entry hole 228; into the water inlet cavity 226; around a first of the at least two tube counterbores 218; into the at least two liquid flow cavities 224; into one end of the at least two pipe cooling cavities 234; and out of an opposing end of the at least two pipe cooling cavities 234 (not shown). An opposing end of the at least two exhaust pipes 212 is retained in a collector or the like (not shown). Each end of the exhaust pipe 212 is removable from the manifold plate 210, the collector or the like without cutting and welding. A manifold assembly for a single exhaust pipe 212 may also be fabricated. The manifold assembly for a single exhaust pipe 212 would also include a water entry hole 228.

With reference to FIGS. 16-22, a liquid cooled manifold 4 preferably includes a manifold plate 310 and at least two exhaust pipes 312 and a retention ring 313. The manifold plate 312 includes at least two o-ring counterbores 314, at least two tube counterbores 316, a plurality of manifold holes 318, at least two water flow cavities 320, an inlet cavity 322 and an inlet hole 324. Each water flow cavity 320 provides fluid communication between two adjacent tube counterbores 316. The inlet cavity 322 provides fluid communication between an end tube counterbore 316 and the inlet hole 324. Each exhaust pipe 312 includes an inner pipe 326 and an outer pipe 328. Each exhaust pipe 312 is preferably formed in the following manner. The inner pipe 326 is inserted into the outer pipe 328. A gap between the inner and outer pipes 326, 328 is filled with lead shot and bent into shape. The lead shot is drained from the gap, after being bent. A pipe cooling cavity 330 is formed between the inner and outer pipes 326, 328. The inner pipe 326 is rolled over to meet the outer pipe 328. A pipe gap 332 is maintained between an end of the inner pipe 326 and a rolled over end of the outer pipe 328 to receive a split locking ring 334. The split locking ring 334 includes a diameter, which is larger than the tube counterbore 316. The split locking ring 334 includes a plurality of openings 336 to allow the flow of water therethrough. A beading tool is preferably used to create a peripheral concave cavity 338 in the rolled-over end of the inner pipe 326. The peripheral concave cavity 338 is sized to receive a pipe o-ring 340. Each retention ring 313 includes an inner o-ring groove 342 and an outer o-ring groove 343.

The liquid cooled exhaust manifold 4 is preferably assembled in the following manner. At least two bottom pipe o-rings 344 are inserted into a bottom of the at least two o-ring counterbores 214. The at least two split locking rings 334 are inserted into the pipe gaps 332 of the at least two exhaust pipes 312. The pipe o-ring 340 is placed in the peripheral concave cavity 338. The at least two exhaust pipes 312 are inserted into the at least two o-ring counterbores 314. An inner retention ring o-ring 346 is inserted into the inner o-ring groove 342 in the retention ring 313. An outer retention ring o-ring 348 is inserted into the outer o-ring grove 343. The retention ring 313 is pushed on to the exhaust pipe 312, until it seats in the tube counterbore 316. The retention ring 313 is pressed into the manifold plate 310.

A plurality of manifold fasteners (not shown) are inserted into the plurality of manifold holes 318. The plurality of fasteners are used to secure the manifold plates 310 to a head of an engine (not shown). Water flows through the water entry hole 324; into the water inlet cavity 322; around a first of the at least two tube counterbores 316; into the at least two liquid flow cavities 320; into one end of the at least two pipe cooling cavities 330; and out of an opposing end of the at least two pipe cooling cavities 330 (not shown). An opposing end of the at least two exhaust pipes 312 is retained in a collector or the like (not shown). Each end of the exhaust pipe 312 is removable from the manifold plate 310, the collector or the like without cutting and welding. A manifold assembly for a single exhaust pipe 312 may also be fabricated. The manifold assembly for a single exhaust pipe 312 would also include a water entry hole 324.

With reference to FIGS. 23-28, a liquid cooled manifold 5 preferably includes a manifold plate 510, at least two exhaust pipes 512 and at least two retention flanges 514. The manifold plate 510 includes at least two o-ring counterbores 516, at least two tube counterbores 518, a plurality of manifold holes 520, at least two water flow cavities 524, an inlet cavity 526 and an inlet hole 528. Each water flow cavity 524 provides fluid communication between two adjacent tube counterbores 518. The inlet cavity 526 provides fluid communication between an end tube counterbore 518 and the inlet hole 528.

Each exhaust pipe 512 includes an inner pipe 530 and an outer pipe 532. Each exhaust pipe 512 is preferably formed in the following manner. The inner pipe 530 is inserted into the outer pipe 532. A gap between the inner and outer pipes 530, 532 is preferably filled with lead shot and bent into shape. The lead shot is drained from the gap, after being bent. A pipe cooling cavity 534 is formed between the inner and outer pipes 230, 232. The inner pipe 530 is rolled over to meet the outer pipe 532. A pipe gap 536 is maintained between an end of the inner pipe 530 and a rolled over end of the outer pipe 532 to receive a split locking ring 538. The split locking ring 538 includes a diameter, which is larger than the tube counterbore 518. The split locking ring 538 includes a plurality of openings 540 to allow the flow of water there through. A beading tool is preferably used to create a peripheral concave cavity 542 in the rolled-over end of the inner pipe 230. The peripheral concave cavity 542 is sized to receive a pipe o-ring 544.

Each retention flange 514 includes a tube hole 546, two attachment lugs 548, an inner o-ring groove 550 and an outer o-ring groove 551. The two attachment lugs 548 extend from opposing ends of the retention flange 514. At least two flange cavities 552 are formed in the manifold plate 510 to receive the at least two retention flanges 514. A fastener hole 554 is formed through each attachment lug 548 to receive a manifold bolt 556.

The liquid cooled exhaust manifold 5 is preferably assembled in the following manner. At least two bottom pipe o-rings 558 are inserted into a bottom of the at least two o-ring counterbores 516. The at least two split locking rings 538 are inserted into the pipe gaps 536 of the at least two exhaust pipes 512. The pipe o-ring 544 is placed in the peripheral concave cavity 542. The at least two exhaust pipes 512 are inserted into the at least two o-ring counterbores 516. A retention flange o-ring 560 is inserted into the inner o-ring groove 550 in the retention flange 548. An outer retention o-ring 561 is inserted into the outer o-ring groove 551. The retention flange 548 is pushed on to the exhaust pipe 512, until it seats in the retention cavity 552. The retention flange 514 is secured to the manifold plate 510 by inserting the two manifold fasteners 556 through the two manifold holes 520 and tightening the two manifold fasteners 556 in a head of an engine (not shown)

Water flows through the water entry hole 528; into the water inlet cavity 526; around a first of the at least two tube counterbores 518; into the at least two liquid flow cavities 524; into one end of the at least two pipe cooling cavities 534; and out of an opposing end of the at least two pipe cooling cavities 534 (not shown). An opposing end of the at least two exhaust pipes 512 is retained in a collector or the like (not shown). Each end of the exhaust pipe 512 is removable from the manifold plate 510, the collector or the like without cutting and welding. A manifold assembly for a single exhaust pipe 512 may also be fabricated. The manifold assembly for a single exhaust pipe 512 would also include the water entry hole 528.

With reference to FIGS. 29-34, a liquid cooled manifold 6 preferably includes a manifold plate 610, at least two exhaust pipes 612 and at least two retention rings 614. The manifold plate 610 includes at least two o-ring counterbores 616, at least two tube counterbores 618, a plurality of manifold holes 620, a plurality of threaded retention holes 622, at least two water flow cavities 624, an inlet cavity 626 and an inlet hole 628. Each water flow cavity 624 provides fluid communication between two adjacent tube counterbores 618. The inlet cavity 626 provides fluid communication between an end tube counterbore 618 and the inlet hole 628.

Each exhaust pipe 612 includes an inner pipe 630 and an outer pipe 632. Each exhaust pipe 612 is preferably formed in the following manner. The inner pipe 630 is inserted into the outer pipe 632. A gap between the inner and outer pipes 630, 632 is filled with lead shot and bent into shape. The lead shot is drained from the gap, after being bent. A pipe cooling cavity 634 is formed between the inner and outer pipes 630, 632. The inner pipe 630 is rolled over to meet the outer pipe 632. A pipe gap 636 is maintained between an end of the inner pipe 630 and a rolled over end of the outer pipe 632 to receive a split locking ring 638. The split locking ring 638 includes a diameter, which is larger than the tube counterbore 618. The split locking ring 638 includes a plurality of openings 640 to allow the flow of water therethrough. A beading tool is preferably used to create a peripheral concave cavity 642 in the rolled-over end of the inner pipe 630. The peripheral concave cavity 642 is sized to receive a pipe o-ring 644.

Each retention ring 614 includes a tube hole 646, a plurality of attachment lugs 648, an inner o-ring groove 650 and an outer o-ring groove 651. The plurality of attachment lugs 648 extend from an outer perimeter of the retention ring 614. A plurality of lug slots 652 extend from an outer perimeter of the at least two tube counter bores 618 to receive the plurality of attachment lugs 648. A fastener hole 654 is formed through each attachment lug 648 to receive a ring fastener 656.

The liquid cooled exhaust manifold 6 is preferably assembled in the following manner. At least two bottom pipe o-rings 658 are inserted into a bottom of the at least two o-ring counterbores 616. The at least two split locking rings 638 are inserted into the pipe gaps 636 of the at least two exhaust pipes 612. The pipe o-ring 644 is placed in the peripheral concave cavity 642. The at least two exhaust pipes 612 are inserted into the at least two o-ring counterbores 616. A retention ring o-ring 660 is inserted into the inner o-ring groove 650 in the retention ring 648. An outer retention o-ring 661 is inserted into the outer o-ring groove 651. The retention ring 648 is pushed on to the exhaust pipe 612, until it seats in the tube counterbore 618 and the plurality of lug slots 652. The retention ring 648 is secured to the manifold plate 610 by tightening the plurality of ring fasteners 656 in the plurality of manifold holes 620.

A plurality of manifold fasteners (not shown) are inserted into the plurality of manifold holes 620. The plurality of manifold fasteners are used to secure the manifold plate 610 to a head of an engine (not shown). Water flows through the water entry hole 628; into the water inlet cavity 626; around a first of the at least two tube counterbores 618; into the at least two liquid flow cavities 624; into one end of the at least two pipe cooling cavities 634; and out of an opposing end of the at least two pipe cooling cavities 634 (not shown). An opposing end of the at least two exhaust pipes 612 is retained in a collector or the like (not shown). Each end of the exhaust pipe 612 is removable from the manifold plate 610, the collector or the like without cutting and welding. A manifold assembly for a single exhaust pipe 612 may also be fabricated. The manifold assembly for a single exhaust pipe 612 would also include a water entry hole 628. The difference between the liquid cooled manifold 6 and the liquid cooled manifold 3 is that the lug slots 652 are formed in a head side of the manifold plate 610 instead of a exhaust pipe side of the manifold plate 610.

Preferably, o-rings are used to seal the exhaust pipes in the manifold plates. However, the sealing should not be limited to the use of o-rings only, but should include any suitable structure or process.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A liquid cooled manifold comprising:
    a manifold plate includes at least two tube counterbores, a water inlet, a water flow cavity, an inlet cavity, wherein water is capable of flowing through said water inlet, said inlet cavity and said water flow cavity to said at least two tube counterbores;
    at least two exhaust pipes each having an inner pipe and an outer pipe, a manifold end and an exhaust end of said at least two exhaust pipes are sealed to form at least two cooling cavities between said inner and outer pipes, at least two peripheral water openings are formed through said at least two outer pipes adjacent said manifold end, wherein water is capable of flowing through said at least two tube counterbores and said at least two water openings to said at least two cooling cavities;
    at least two retention devices for axially retaining said at least two exhaust pipes relative to said manifold plate, wherein said manifold plate is capable of being attached to an engine with a plurality of fasteners; and
    at least two split locking rings, one of said at least two split locking rings includes a plurality of openings to allow water to flow therethrough, said at least two split locking rings are retained in said at least two peripheral water openings.

2. The liquid cooled manifold of claim 1, further comprising:
    each one of said at least two retention devices is a retention ring, said retention ring retains one of said at least two exhaust pipes in one of said at least two tube counterbores with a second plurality of fasteners.

3. The liquid cooled manifold of claim 1, further comprising:
    each one of said at least two retention devices is a retention flange, said retention flange retains one of said at least two exhaust pipes in one of said at least two tube counterbores with said plurality of fasteners.

4. The liquid cooled manifold of claim 1, further comprising:
    at least two first exhaust pipe o-rings for sealing said at least two exhaust pipes in said at least two tube counterbores.

5. The liquid cooled manifold of claim 1 wherein:
    said at least two water openings are formed around a perimeter of said at least two outer pipes.

6. The liquid cooled manifold of claim 1 wherein:
    said manifold end and said exhaust end of said at least two exhaust pipes are sealed with a roll forming operation.

7. A liquid cooled manifold comprising:
    a manifold plate includes at least two tube counterbores, a water inlet and a water flow cavity, wherein water is capable of flowing through said water inlet and said water flow cavity to said at least two tube counterbores;
    at least two exhaust pipes each having an inner pipe and an outer pipe, a manifold end and an exhaust end of said at least two exhaust pipes are sealed to form at least two cooling cavities between said inner and outer pipes, at least two peripheral water openings are formed through said at least two outer pipes adjacent a manifold end, wherein water is capable of flowing from said at least two tube counterbores and said at least two peripheral water openings to said at least two cooling cavities;
    at least two retention devices for axially retaining said at least two exhaust pipes relative to said manifold plate, wherein said manifold plate is capable of being attached to an engine with a plurality of fasteners; and
    at least two split locking rings, one of said at least two split locking rings includes a plurality of openings to allow water to flow therethrough, said at least two split locking rings are retained in said at least two peripheral water openings.

8. The liquid cooled manifold of claim 7, further comprising:
    each one of said at least two retention devices is a retention ring, said retention ring retains one of said at least two exhaust pipes in one of said at least two tube counterbores with a second plurality of fasteners.

9. The liquid cooled manifold of claim 7, further comprising:
    each one of said at least two retention devices is a retention flange, said retention flange retains one of said at least two exhaust pipes in one of said at least two tube counterbores with said plurality of fasteners.

10. The liquid cooled manifold of claim 7, further comprising:
    at least two first exhaust pipe o-rings for sealing said at least two exhaust pipes in said at least two tube counterbores.

11. The liquid cooled manifold of claim 7 wherein:
    said at least two water openings are formed around a perimeter of said at least two outer pipes.

12. The liquid cooled manifold of claim 7 wherein:
    said manifold end and said exhaust end of said at least two exhaust pipes are sealed with a roll forming operation.

* * * * *